(12) United States Patent
Kataoka et al.

(10) Patent No.: US 6,843,840 B2
(45) Date of Patent: Jan. 18, 2005

(54) INK SET AND INK-JET RECORDING METHOD

(75) Inventors: Shuichi Kataoka, Nagano-ken (JP); Kiyohiko Takemoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/451,766

(22) PCT Filed: May 1, 2002

(86) PCT No.: PCT/JP02/04369
§ 371 (c)(1),
(2), (4) Date: Dec. 16, 2003

(87) PCT Pub. No.: WO02/100959
PCT Pub. Date: Dec. 19, 2002

(65) Prior Publication Data
US 2004/0103818 A1 Jun. 3, 2004

(30) Foreign Application Priority Data
May 2, 2001 (JP) .................................. 2001-135368
Mar. 6, 2002 (JP) .................................. 2002-060766

(51) Int. Cl.$^7$ ................................................ C09D 11/00
(52) U.S. Cl. ...................................................... 106/31.6
(58) Field of Search ........................................ 106/31.6

(56) References Cited

U.S. PATENT DOCUMENTS

| | | | | |
|---|---|---|---|---|
| 6,342,095 B1 | * | 1/2002 | Takizawa et al. | 106/31.27 |
| 6,387,168 B1 | * | 5/2002 | Koitabashi et al. | 106/31.6 |
| 6,395,079 B1 | * | 5/2002 | Sano | 106/31.59 |
| 6,419,733 B1 | * | 7/2002 | Sano et al. | 106/31.86 |
| 6,602,333 B2 | * | 8/2003 | Miyabayashi | 106/31.27 |
| 6,652,084 B1 | * | 11/2003 | Teraoka et al. | 347/100 |
| 6,670,409 B2 | * | 12/2003 | Yatake | 523/160 |
| 2002/0041317 A1 | * | 4/2002 | Kashiwazaki et al. | 347/100 |
| 2003/0048342 A1 | * | 3/2003 | Kashiwazaki et al. | 347/100 |
| 2003/0079643 A1 | * | 5/2003 | Tomioka et al. | 106/31.27 |
| 2003/0103121 A1 | * | 6/2003 | Tomioka et al. | 347/100 |
| 2003/0146962 A1 | * | 8/2003 | Ogasawara et al. | 347/100 |
| 2003/0177942 A1 | * | 9/2003 | Yamazaki | 106/31.27 |
| 2004/0020406 A1 | * | 2/2004 | Kato | 106/31.6 |
| 2004/0020407 A1 | * | 2/2004 | Kato | 106/31.6 |

FOREIGN PATENT DOCUMENTS

| | | |
|---|---|---|
| EP | 0933406 | 8/1999 |
| EP | 1048702 | 11/2000 |
| JP | 2000-351928 | 12/2000 |
| WO | 99/05230 | 2/1999 |

OTHER PUBLICATIONS

English Translation of JP 2000–351928 Dated Dec. 19, 2000.
English Abstract of WO 99/05230 Dated Feb. 4, 1999.

* cited by examiner

*Primary Examiner*—Mark L. Bell
*Assistant Examiner*—Veronica F. Faison
(74) *Attorney, Agent, or Firm*—Ladas & Parry LLP

(57) ABSTRACT

The present invention provides an ink set comprising at least three color inks, which are yellow ink whose hue angle H°, as defined in the CIELAB color space on a recording medium (PM photographic paper; same below), is in a range of about 80° to about 110°, magenta ink whose hue angle H° is in a range of about 330° to about 360°, and cyan ink whose hue angle H° is in a range of about 230° to about 260°, and further comprising ink (A) and/or ink (B) described below. With the present ink set, it is possible to provide a highly reliable ink set that can be used in inkjet recording and can produce printed matter having a wide color reproduction range, high color saturation, good graininess, and an adequate glossy look.

39 Claims, 1 Drawing Sheet

INK SET AND INK-JET RECORDING METHOD

TECHNICAL FIELD

The present invention relates to an ink set comprising at least the three color inks yellow, magenta, and cyan, and special colored inks other than-these, and more particularly to a pigment ink set and an inkjet recording method that uses this.

BACKGROUND ART

In common practice, pigment ink has superior image solidity of printed matter in comparison with dye ink, and is used in inks for wide-format color inkjet recording for commercial signs and displays, and in applications that take advantage of the characteristics thereof. In this color inkjet recording, three-color ink sets comprising pigment inks of the three colors yellow (Y), magenta (M), and cyan (C) (which are the three primary colors of subtractive color mixtures), or four-color ink sets with black (K) added to these are used to render a variety of hues.

However, the above-described three-color or four-color ink sets have drawbacks such as a narrow color reproduction range and reduced color saturation of printed portions (mixed color portions) having secondary and higher color, and have not achieved a level that is capable of providing printed matter with-high image quality comparable to silver-salt photography, process-printing, and the like.

A method of increasing the pigment concentration of each color in YMC ink, a method of increasing the quantity of each color of YMC ink applied to the recording medium, and other methods have also been adopted to solve the problem of reduced color saturation by enhancing it, but all these methods have drawbacks such as a reduced glossy look and the inability to produce the feel of a photograph even when glossy paper is used as a recording medium. Pigment types for YMC inks with ideal spectral characteristics suitable for subtractive color mixtures must be selected in order to effectively spread the color saturation solely with the three primary color (YMC) inks, but the number of pigment types having excellent light fastness, gas resistance, and the like is limited, and when an attempt is made to enhance color saturation among such limited pigment types by increasing the pigment concentration as described above, there is the risk that the hue of the three primary colors may change, the inkjet printer nozzle may clog, or other undesirable effects may occur, resulting in lost efficiency.

A color inkjet ink set for color prints comprising at least one color selected from among orange, green, and violet, each containing a specified pigment, in addition to the three pigment ink colors YMC, is disclosed in Japanese Patent Application Laid-open No. 2000-351928 as a pigment ink set with a wide color reproduction range, but this ink set cannot be said to have an adequately wide reproduction range of color saturation, and is not capable of increasing the color saturation without having an adverse effect on the glossy look. More particularly, it is not capable of raising the color saturation of vermilion without having an adverse effect on graininess. An ink set comprising the two characteristic pigment ink colors orange and green, in addition to the four pigment ink colors YMCK, is disclosed in WO99/05230, but while having excellent reproducibility of colors with high brightness and low color saturation, such as colors with pastel tones, this ink set has an inadequate reproduction range of color saturation with regard to other colors in the same manner as the above-stated ink set, and is not capable of enhancing color saturation without adversely affecting the glossy look.

Thus, conventional pigment ink sets are not capable of providing printed matter with a wide color reproduction range, high color saturation, and high image quality without-adversely affecting the glossy look.

Providing printed matter with superior graininess and high color saturation is particularly desired in relatively small photographs and the like (L size or the like).

Printed matter recorded with an inkjet using a conventional pigment ink set has a drawback which causes so-called metamerism, a phenomenon whereby the hue changes when a different illuminating light source is used. This metamerism is particularly pronounced in composite black- or gray-based hue portions formed with the three color inks YMC, and is a source of reduced image quality.

Consequently, an object of the present invention is to provide a highly reliable ink set as an ink set for inkjet recording capable of providing printed matter having a wide color reproduction range, high color saturation, good graininess, and an adequate glossy look.

Another object of the present invention is to provide an inkjet recording method that uses the above-stated ink set, wherein this inkjet recording method is capable of providing printed matter that has high image quality and reduced metamerism.

DISCLOSURE OF THE INVENTION

The present inventors, as a result of investigations concerning an inkjet recording method that uses an ink set that comprises pigment inks of the three colors YMC, realized that a reduction of pigment solids in the ink was necessary to improve graininess and glossiness. However, when this means was applied to current inks of the three colors YMC, it was found that the coloring of secondary color was significantly reduced. In view of the above, it was found that the reproduction range of color saturation can be extended without any adverse effect on graininess or glossiness by adopting an approach in which a pigment ink set comprising one or two types of pigment ink whose hue angle H°, as defined in the CIELAB color space on a recording medium, falls within a specified range is used as a special color ink in addition to the aforementioned inks. It was also found that when a mixed color portion of secondary or higher color is formed using this pigment ink set, ink (A) and/or ink (B) can be printed (because of the adequate graininess) from a low-saturation color by using the special color ink, and metamerism can be reduced.

The present invention was perfected based on the above-described findings, and achieves the above-stated objects by providing an ink set comprising at least three color inks, which are yellow ink whose hue angle H°, as defined in the CIELAB color space on a recording medium, is in a range of about 80° to about 110°, magenta ink whose hue angle H° is in a range of about 330° to about 360°, and cyan ink whose hue angle H° is in a range of about 230° to about 260°, and further comprising ink (A) and/or ink (B) described below.

Ink (A): An ink whose hue angle H° is about 0° to about 80°.

Ink (B): An ink whose hue angle H° is about 260° to about 330°.

[The above-described hue angle H° is calculated from $H°=\tan^{-1}(b*/a*)+180$ (where $a*<0$), or $H°=\tan^{-1}(b*/a*)+360$ (where $a*>0$). Here, $a*$ and $b*$ express chromaticity indices defined in the CIELAB color space.]

The present invention achieves the above-state objects by providing an inkjet recording method for forming characters and/or images on a recording medium using the above-described ink set.

BEST MODE FOR CARRYING OUT THE INVENTION

Figure 1:
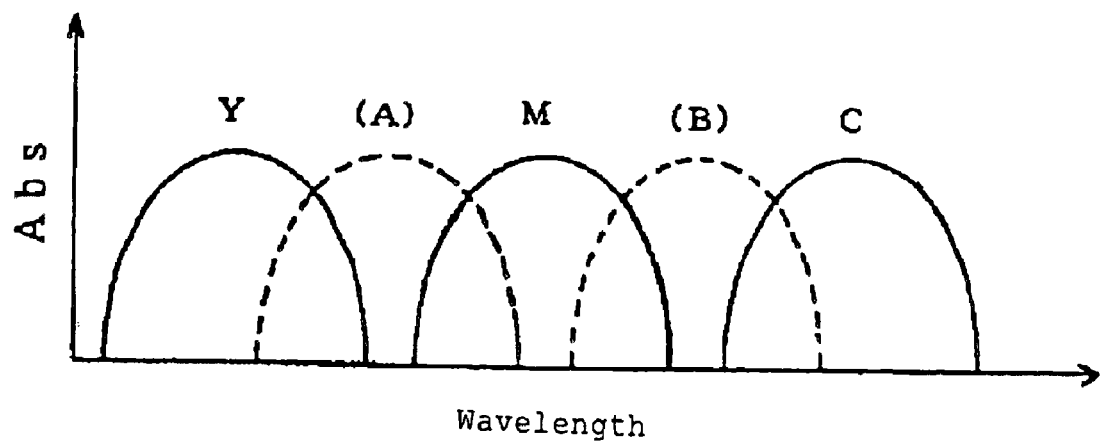
FIG. 1 is a schematic depicting spectral characteristics of mixed color portions obtained by the inkjet recording method of the present invention.

The ink set of the present invention is first described below based on preferred embodiments thereof.

The ink set of the present embodiment comprises at least three color inks, which are yellow ink whose hue angle H°, as defined in the CIELAB color space on a recording medium, is in a range of about 80° to about 110°, magenta ink whose hue angle H° is in a range of about 330° to about 360°, and cyan ink whose hue angle H° is in a range of about 230° to about 260°, and further comprises ink (A) and/or ink (B) described below.

The above-described recording medium is preferably PM photographic paper. A preferred example of such PM photographic paper is PM photographic paper "Kohtaku" KA420PSK. The coloring material of each ink is preferably pigment ink, but is not limited to this.

Ink (A), which is one of the above-described special color inks, is an ink whose hue angle H°, as defined in the CIELAB color space on a recording medium, is in a range of about 0° to about 80°.

The ink (B), which is the other of the above-described special color inks, is an ink whose hue angle H°, as defined in the CIELAB color space on a recording medium, is in a range of about 260° to about 330°.

The hue angle H° is calculated from $H° = \tan^{-1}(b*/a*) + 180$ (where $a*<0$), or $H° = \tan^{-1}(b*/a*) + 360$ (where $a*>0$). Here, $a*$ and $b*$ express chromaticity indices defined in the CIELAB color space.

The brightness of inks (A) and (B) is preferably lower than the brightness of the above-described magenta and cyan inks, and the color saturation of inks (A) and (B) is higher than the color saturation of the above-described magenta and cyan inks.

According to such a definition, the color saturation of a high-brightness portion can be raised with CMY ink, and the color saturation of a low-brightness portion can be raised by adding ink (A) and/or ink (B).

The above-described yellow ink preferably has an absorption spectrum in which the absorption area between 400 nm and 500 nm is no less than 30 abs·nm and no more than 350 abs·nm. The absorption area for yellow between 400 nm and 500 nm is preferably no less than 30 abs·nm and no more than 250 abs·nm, and even more preferably no less than 30 abs·nm and no more than 200 abs·nm.

The above-described magenta ink preferably has an absorption spectrum in which the absorption area between 500 nm and 600 nm is no less than 20 abs·nm and no more than 200 abs·nm. The absorption area for magenta between 500 nm and 600 nm is preferably no less than 20 abs·nm and no more than 150 abs·nm, and even more preferably no less than 20 abs·nm and no more than 60 abs·nm.

The above-described cyan ink preferably has an absorption spectrum in which the absorption area between 600 nm and 700 nm is no less than 50 abs·nm and no more than 400 abs·nm. The absorption area for magenta between 600 nm and 700 nm is preferably no less than 50 abs·nm and no more than 300 abs·nm, and even more preferably no less than 50 abs·nm and no more than 100 abs·nm.

As used herein, the term "absorption area (abs·nm)" refers to a value that is the sum of each absorption (abs) at each wavelength (nm), expressed as a surface. When, for example, the absorption of the absorption spectrum between 400 nm and 500 nm is 1 abs, the absorption area between 400 nm and 500 nm is 1 [abs]×(500−400) [nm]=100 abs·nm.

The absorption area between 500 nm and 600 nm of ink (A) is preferably equal to or greater than the absorption area between 500 nm and 600 nm of the above-described magenta ink.

The absorption area between 500 nm and 600 nm of ink (A) is preferably no less than 1.0 times and no more than 3.5 times, and even more preferably no less than 1.5 times and no more than 3.0 times, the absorption area between 500 nm and 600 nm of the above-described magenta ink.

The absorption area between 400 nm and 500 nm of ink (A) is preferably no less than 0.5 times and no more than 2.0 times, and even more preferably no less than 0.5 times and no more than 1.0 times, the absorption area between 500 nm and 600 nm of ink (A).

The absorption area between 400 nm and 500 nm of ink (A) is preferably no less than 40 abs·nm and no more than 200 abs·nm, and even more preferably no less than 40 abs·nm and no more than 100 abs·nm.

The absorption area between 500 nm and 600 nm of ink (A) is preferably no less than 20 abs·nm and no more than 200 abs·nm, and even more preferably no less than 20 abs·nm and no more than 150 abs·nm.

The absorption area between 500 nm and 600 nm of ink (B) is preferably equal to or greater than the absorption area between 600 nm and 700 nm of the above-described cyan ink.

The absorption area between 500 nm and 600 nm of ink (B) is preferably no less than 1.0 times and no more than 3.0 times, and even more preferably no less than 1.0 times and no more than 2.0 times, the absorption area between 600 nm and 700 nm of the above-described cyan ink.

The absorption area between 500 nm and 600 nm of ink (B) is preferably no less than 0.5 times and no more than 5.0 times, and even more preferably no less than 3.0 times and no more than 4.0 times, the absorption area between 600 nm and 700 nm of ink (B).

The absorption area between 500 nm and 600 nm of ink (B) is preferably no less than 50 abs·nm and no more than 350 abs·nm, and even more preferably no less than 50 abs·nm and no more than 200 abs·nm.

The absorption area between 600 nm and 700 nm of ink (B) is preferably no less than 20 abs·nm and no more than 150 abs·nm, and even more preferably no less than 20 abs·nm and no more than 100 abs·nm.

The ink set in the present embodiment may comprise a yellow ink having an absorption spectrum in which the absorption area between 400 nm and 500 nm is no less than 30 abs·nm and no more than 350 abs·nm, a magenta ink having an absorption spectrum in which the absorption area between 500 nm and 600 nm is no less than 20 abs·nm and no more than 200 abs·nm, a cyan ink having an absorption spectrum in which the absorption area between 600 nm and 700 nm is no less than 50 abs·nm and no more than 400 abs·nm, and ink (A) and/or ink (B) described below.

Ink (A): An ink whose absorption area between 500 nm and 600 nm is equal to or greater than the absorption area between 500 nm and 600 nm of the magenta ink.

Ink (B): An ink whose absorption area between 500 nm and 600 nm is equal to or greater than the absorption area between 600 nm and 700 nm of the cyan ink.

The absorption area between 500 nm and 600 nm of ink (A) may be no less than 1.0 times and no more than 3.5 times the absorption area between 500 nm and 600 nm of the above-described magenta ink. The absorption area between 500 nm and 600 nm of ink (B) may be no less than 1.0 times and no more than 3.0 times the absorption area between 600 nm and 700 nm of the above-described cyan ink.

The ink set in the present embodiment may comprise a yellow ink having an absorption spectrum in which the absorption area between 400 nm and 500 nm is no less than 30 abs·nm and no more than 350 abs·nm, a magenta ink having an absorption spectrum in which the absorption area between 500 nm and 600 nm is no less than 20 abs·nm and no more than 200 abs·nm, a cyan ink having an absorption spectrum in which the absorption area between 600 nm and 700 nm is no less than 50 abs·nm and no more than 400 abs·nm, and ink (A) and/or ink (B) described below.

Ink (A): An ink whose absorption area between 400 nm and 500 nm of ink (A) is no less than 0.5 times and no more than 2.0 times the absorption area between 500 nm and 600 nm of ink (A).

Ink (B): An ink whose absorption area between 500 nm and 600 nm of ink (B) is no less than 0.5 times and no more than 5.0 times the absorption area between 600 nm and 700 nm of ink (B).

In a preferred embodiment of the present invention, each of the pigment solids concentrations of the magenta ink and cyan ink should preferably be set to 2 wt % or less, and each of the pigment solids concentrations of ink (A), ink (B), and yellow ink should preferably be set to 2 wt % or greater because of considerations related to glossiness and color saturation. Superior glossiness, color saturation, and graininess are achieved with such concentrations. Each of the pigment solids concentrations of the magenta ink and cyan ink should preferably be kept no less than 0.1 wt % but no more than 2 wt [%], and more preferably no less than 1.5 wt % but no more than 2 wt %, because of considerations related to glossiness, color saturation, and graininess. Each of the pigment (solids) contents of ink (A), ink (B), and yellow should preferably be kept between 2 and 6 wt %, and even more preferably between 2 and 4 wt %, of the total ink weight because of considerations related to the balance between the reliability of the ink for inkjet recording, print density, and graininess at a color saturation of 40.

In a preferred embodiment of the present invention, each of the pigment solids concentrations of the yellow ink, magenta ink, and cyan ink should preferably be kept no less than 0.1 wt % but no more than 2 wt %, and the pigment solids concentrations of ink (A) and ink (B) should preferably be kept no less than 2 wt % but no more than 6 wt %. Printed matter having superior glossiness and color saturation (glossiness in particular) is obtained with such concentrations. Each of the pigment contents of the three color inks yellow, magenta, and cyan should preferably be kept between 0.1 wt % and 2 wt %, and more preferably between 1.5 wt % and 2 wt %, of the total ink weight because of considerations related to improving glossiness and color saturation. Each of the pigment contents of ink (A) and ink (B) should preferably be kept between 2 and 6 wt %, and even more preferably between 2 and 4 wt %, of the total ink weight because of considerations related to the balance between the reliability of the ink for inkjet recording, print density, and graininess at a color saturation of 40.

In a preferred embodiment of the present invention, each of the pigment solids concentrations the yellow ink, magenta ink, cyan ink, ink (A), and ink (B) should preferably be kept set to 2 wt % or greater. Superior color reproducibility is achieved with such concentrations because high color saturation can be obtained with a small deposited quantity of ink on the recording medium. Thus, when recording is performed on inexpensive glossy paper having a thin ink absorption layer, the glossiness is excellent because of exiguous ink overflow. When recording on large sizes, a sharp, clear image can be obtained because a certain degree of graininess is provided.

The coloring material contained in the above-described inks is preferably a pigment.

Inorganic pigments and organic pigments may be used for the pigment contained in the ink related to the present embodiment, and each may be used individually or as a plurality of types mixed. Carbon black manufactured with the contact method, furnace method, thermal method, or other known methods can be used in addition to, for example, titanium oxide and iron oxide as the inorganic pigment. Examples of the aforementioned organic pigments include azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinacridone pigments, dioxazine pigments, thioindigo pigments, isoindolinone pigments, quinofuralone pigments, or the like), dye chelates (for example, basic dye chelates, acidic dye chelates, or the like), nitro pigments, nitroso pigments, aniline black, and the like.

Specific pigment examples are listed below.

One, two, or more types selected from the group comprising C.I. Pigment Orange 5, 43, and 62, as well as C.I. Pigment Red 17, 49:2, 112, 149, 177, 178, 188, 255, and 264 can be used as the pigments contained in ink (A).

Among these, one, two, or more types selected from the group comprising C.I. Pigment Red 149, 177, 178, and 264 are particularly preferred for such use. In this case, ink (A) yields better graininess and glossiness as a closer match is achieved between the brightness of a color that can be formed with single color ink (A), and the brightness of a color with the same color saturation and hue angle, but formed by mixing yellow ink and magenta ink as the only two colors.

One, two, or more types selected from the group comprising C.I. Pigment Blue 60 as well as C.I. Pigment Violet 3, 19, 23, 32, 36, and 38 can be used as the pigments contained in ink (B).

Among these, one, two, or more types selected from the group comprising C.I. Pigment Blue 60 as well as C.I. Pigment Violet 19, and 23 are particularly preferred for such use. In this case, ink (B) yields better graininess and glossiness as a closer match is achieved between the brightness of a color that can be formed with single color ink (B), and the brightness of a color with the same color saturation and hue angle, but formed by mixing cyan ink and magenta ink as the only two colors.

C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185 can be cited as examples of a pigment that may be contained in the yellow ink; and one, two, or more types thereof may be used. Among these, one, two, or more types selected from the group comprising C.I. Pigment Yellow 74, 110, 128 and 147 are particularly preferred for such use.

C.I. Pigment Red 5, 7, 12, 48 (Ca), 48 (Mn), 57 (Ca), 57:1, 112, 122, 123, 168, 184, 202, and 209, as well as C.I. Pigment Violet 19 can be cited as examples of a pigment that may be contained in the magenta ink; and one, two, or more types thereof may be used. Among these, one, two, or more types selected from the group comprising C.I. Pigment Red 122, 202, and 209, as well as C.I. Pigment Violet 19 are particularly preferred for such use.

C.I. Pigment Blue 1, 2, 3, 15:3, 15:4, 15:34, 16, 22, and 60, as well as C.I. Vat Blue 4 and 60 can be cited as examples of a pigment that may be contained in the cyan ink; and one, two, or more types thereof may be used. Among these, C.I. Pigment Blue 15:3 and/or 15:4 in particular are preferred, and C.I. Pigment Blue 15:3 is especially preferred.

The ink set in the present embodiment comprises one, two, or more types of ink selected from the two above-described characteristic color inks and the three above-described yellow, magenta, and cyan color inks, but black ink may further be added as required. Examples of pigments that may be contained in the black ink include furnace black, lamp black, acetylene black, channel black, and other types of carbon black (C.I. Pigment Black 7); iron oxide pigments and other inorganic pigments; and aniline black (C.I. Pigment Black 1) and other organic pigments. In particular, carbon black is preferably used, and preferable examples of such carbon black include No. 2300, No. 900, MCF88, No. 33, No. 40, No. 52, MA7, MA8, MA100, No. 2200B, and the like from Mitsubishi Chemical; Raven 5750, Raven 5250, Raven 5000, Raven 3500, Raven 1255, Raven 700, and the like from Columbia; Regal 400R, Regal 400R, Regal 1660R, Mogul 1, Monarch 700, Monarch 800, Monarch 880, Monarch 900, Monarch 1000, Monarch 1100, Monarch 1300, Monarch 1400 and the like from Cabot; and Color Black FW1, Color Black FW2, Color Black FW2V, Color Black FW18, Color Black FW200, Color Black S150, Color Black S160, Color Black S170, Printex 35, Printex U, Printex V, Printex 140U, Specil Black 6, Specil Black 5, Specil Black 4A, Special Black 4 and the like from Degussa.

The content of pigment (solids) in the black ink should preferably be kept between 0.1 and 4 wt %, and even more preferably between 1 and 3 wt %.

The brightness of ink (A) is preferably lower than the brightness of the yellow ink and/or the brightness of the magenta ink. The brightness of ink (A) on a recording medium should preferably be kept between 35 and 65, and even more preferably between 40 and 50.

The brightness of ink (B) is preferably lower than the brightness of the magenta ink and/or the brightness of the cyan ink. The brightness of ink (B) on a recording medium should preferably be kept between 5 and 65, and even more preferably between 5 and 15.

The optical densities (OD values) of the yellow ink, magenta ink, and cyan ink on a recording medium are preferably 1.7 or greater, 1.0 or greater, and 2.0 or greater, respectively.

There is no need to assign an upper limit to the OD value from the viewpoint of graininess if the brightness on a recording medium is 45 or greater, but the OD value of the yellow ink, for example, should preferably be kept between 1.7 and 2.4, and particularly preferably between 1.7 and 1.9, to obtain extremely high glossiness.

The OD value of the magenta ink on a recording medium should preferably be kept between 1.0 and 2.6, and particularly preferably between 1.2 and 2.0, to obtain very good graininess.

The OD value of the cyan ink on a recording medium should preferably be kept between 2.0 and 2.7, and particularly preferably between 2.0 and 2.5, to obtain very good graininess.

Ink (A) is preferably an ink for which the color saturation $C^*_{(Y+M)}$ of the hue angle $H°_{(Y+M)}$ in a mixed color portion formed by mixing the yellow ink and magenta ink on a recording medium can be obtained by consuming a weight that is less than $(I_Y+J_{1M})$, where $I_Y$ is the weight of the yellow ink, and $J_{1M}$ is the weight of the magenta ink. The color saturation $C^*$ is calculated using the formula $C^*=\{(a^*)^2+(b^*)^2\}^{1/2}$.

Ink (B) is preferably an ink for which the color saturation $C^*_{(M+C)}$ of the hue angle $H°_{(M+C)}$ in a mixed color portion formed by mixing the magenta ink and cyan ink on a recording medium can be obtained by consuming a weight that is less than $(J_{2M}+K_C)$, where $J_{2M}$ is the weight of the magenta ink, and $K_C$ is the weight of the cyan ink.

The color saturation $C^*_A$ of ink (A) is preferably higher than the color saturation $C^*_Y$ of the yellow ink and/or the color saturation $C^*_M$ of the magenta ink ($C^*_A > C^*_Y$ and/or $C^*_A > C^*_M$).

An ink (A) having a hue angle of 40°±10° may be provided for coloring a high-saturation color (vermilion) with a hue angle between 0° and 30°.

The color saturation $C^*_B$ of ink (B) is preferably higher than the color saturation $C^*_M$ of the magenta ink and/or the color saturation $C^*_C$ of the cyan ink ($C^*_B > C^*_M$ and/or $C^*_B > C^*_C$).

The color saturation $C^*_A$ of ink (A) on a recording medium is preferably 80 or greater, and even more preferably 90 or greater.

The color saturation $C^*_B$ of ink (B) on a recording medium is preferably 80 or greater, and even more preferably 90 or greater.

The color saturations $C^*_Y$, $C^*_M$, $C^*_C$ of the yellow ink, magenta ink, and cyan ink on a recording medium are preferably each between 70 and 120, more preferably between 80 and 110, and even more preferably between 80 and 90.

The hue range of ink (A) on a recording medium preferably falls within the ranges a*=about 60 to about 80 and b*=about 20 to about 80, or a*=about 30 to about 60 and b*=about 60 to about 100.

The hue range of ink (B) on a recording medium preferably falls within the ranges a*=about 50 to about 70 and b*=about −70 to about −50, or a*=about 40 to about 60 and b*=about −80 to about −60.

The hue range of the yellow ink on a recording medium preferably falls within the ranges a*=about −30 to about 20 and b*=about 70 to about 130; the hue range of the magenta ink preferably falls within the ranges a*=about 60 to about 90 and b*=about −40 to about −10; and the hue range of the cyan ink preferably falls within the ranges a*=about −50 to about −20 and b*=about −70 to about −40.

For each ink, the ink weight at 100% duty should preferably be kept between 10 and 20 mg/inch$^2$, more preferably between 12 and 18 mg/inch$^2$, and even more preferably 14 and 16 mg/inch$^2$.

When the pigment solids of the magenta ink and cyan ink on a recording medium constitute 0.2 mg/inch$^2$, the brightness should preferably be 45 or greater.

The coloring material contained in the inks is preferably a pigment.

From the viewpoint of raising the dispersion stability of the pigment, a dispersing agent should preferably be added to the ink related to the present embodiment. The dispersing agent may be the same type of agent as that normally used with such pigment inks, and is not subject to any particular limitations. Examples include polymer dispersing agents, cationic surfactants, anionic surfactants, nonionic surfactants, and the like. Examples of polymer dispersing agents include polyacrylic acid, polymethacrylic acid, acrylic acid-acrylonitrile copolymers, vinyl acetate-acrylic ester copolymers, acrylic acid-acrylate alkyl ester copolymers, styrene-acrylic acid copolymers, styrene-methacrylic acid copolymers, styrene-acrylic acid-acrylate alkyl ester copolymers, styrene-methacrylic acid-acrylate alkyl ester copolymers, styrene-α-methylstyrene-acrylic acid copolymers, styrene-α-methylstyrene-acrylic acid-acrylate alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleate copolymers, vinyl acetate-crotonic acid copolymers, and vinyl acetate/acrylic acid copolymers. Examples of cationic surfactants include ammonium salts of polyoxyethylene alkyl ether sulfates; examples of anionic surfactants include sodium dodecylbenzenesulfonate and sodium laurylate; examples of nonionic surfactants include polyoxyethylene alkyl ethers, polyoxyethylene alkyl esters, polyoxyethylene sorbitan fatty acid esters, polyoxyethylene alkyl phenyl ethers, polyoxyethylene alkylamines, and polyoxyethylene alkylamides. One, two, or more types of these may be used. The use of styrene-(meth)acrylic acid copolymers in particular is preferred.

The content of dispersing agent in the ink should preferably be kept between 0.1 and 10 wt %, and even more preferably between 0.3 and 6 wt %, in relation to the pigment in terms of solids.

From the viewpoint of preventing the ink from drying and clogging the inkjet printer head, a high-boiling organic solvent should preferably be added to the ink related to the present embodiment.

Examples of such high-boiling organic solvents include ethylene glycol, diethylene glycol, triethylene glycol, polyethylene glycol, polypropylene glycol, propylene glycol, butylene glycol, 1,2,6-hexanetriol, thiodiglycol, hexylene glycol, glycerin, trimethylolethane, trimethylolpropane, and other polyhydric alcohols; and ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, and other alkyl ethers of polyhydric alcohols, as well as urea, 2-pyrrolidone, N-methyl-2-pyrrolidone, 1,3-dimethyl-2-imidazolidinone, triethanolamine, sugar alcohols, and other sugars. One, two, or more types of these may be used.

The content of high-boiling organic solvent in the ink should preferably be kept between 0.1 and 30 wt %, and more preferably between 0.5 and 20 wt %.

From the viewpoint of reducing the ink drying time, a low-boiling organic solvent may be added to the ink related to the present embodiment. Examples of low-boiling solvents include methanol, ethanol, n-propyl alcohol, isopropyl alcohol, n-butanol, sec-butanol, tert-butanol, isobutanol, n-pentanol, and the like; and one, two, or more types of these may be used. The use of a monohydric alcohol in particular is preferred.

From the viewpoint of improving wettability and permeability in relation to the recording medium, a permeation accelerator may be added to the ink related to the present embodiment. Examples of permeation accelerators include cationic surfactants, anionic surfactants, nonionic surfactants, and other surfactants; methanol, ethanol, isopropyl alcohol, and other alcohols; ethylene glycol monomethyl ether, diethylene glycol monoethyl ether, diethylene glycol monobutyl ether, triethylene glycol monobutyl ether, propylene glycol monobutyl ether, propylene glycol monobutyl ether, and other lower alkyl ethers of polyhydric alcohols; and 1,2-pentanediol, 1,2-hexanediol, and other diols. One, two, or more types of these may be used. The use of diethylene glycol monobutyl ether, triethylene glycol monobutyl ether, or 1.2-hexanediol in particular is preferred.

The content of permeation accelerator in the ink should preferably be kept between 1 and 20 wt %, and more preferably between 1 and 10 wt %.

A polysiloxane compound or acetylene glycol compound expressed by general formula (1) below may be used as the permeation accelerator. A commercial product may be used as the acetylene glycol compound, examples of which include Surfynol 82, 440, 465, STG (trade names, manufactured by Air Products And Chemicals), Olefin Y, Olfine E1010 (trade names, manufactured by Nisshin Chemical Industry), and the like; and one, two, or more types of these may be used. The use of Surfynol 465 in particular is preferred. BYK-348 (manufactured by BYK-Chemie Japan) or another commercial product may be used as the polysiloxane compound.

The content of acetylene glycol compound and/or the polysiloxane compound in the ink should preferably be kept between 0.1 and 5 wt %, and more preferably between 0.5 and 2 wt %.

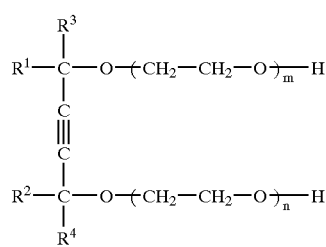

(Formula 1)

(In the formula, $0 \leq m+n \leq 50$, and $R^1$ to $R^4$ are each independently an alkyl group with a carbon number of 1 to 6.)

Other than the pigments, the following components may also be added as needed to the inks related to the present embodiment, with water constituting the balance: a dispersing agent, a high-boiling organic solvent, a low-boiling organic solvent, and a permeation accelerator. Deionized water, ultrafiltrated water, reverse osmotic water, distilled water, or another type of pure or ultrapure water is preferably used for water. In particular, water obtained by sterilizing this type of water through irradiation with ultraviolet light, addition of hydrogen peroxide, or the like is preferred because the occurrence of mold and bacteria are prevented over a long period of time.

The inks related to the present embodiment may contain, as required, water-soluble rosins or other stabilizers, sodium benzoate or other antifungal agents/preservatives, allophanates or other antioxidants/ultraviolet absorbers, chelating agents, pH regulators, and other additives; and one, two, or more types of these may be used.

The inks related to the present embodiment may be prepared in the same manner as conventional inks with the aid of well-known conventional devices, examples of which include ball mills, sand mills, attritors, basket mills, roll mills, and the like. Membrane filters, mesh filters, and the like are preferably used to remove coarse particles during preparation.

The ink set of the present embodiment is preferably used in inkjet recording processes, which are recording medium methods whereby droplets of ink are ejected from a nozzle, and the droplets are allowed to adhere to a recording medium to form characters and/or images, and are particularly preferred for use in on-demand inkjet recording processes. Examples of on-demand inkjet recording processes include piezoelement recording methods whereby recording is performed by using a piezoelement disposed in the printer head, and thermal jet recording methods whereby recording is performed by using thermal energy generated by a heater or other component of a heating resistive element disposed in the printer head, and may be advantageously used in either type of inkjet recording method.

The ink set of the present embodiment further comprises one or two types of special color inks selected from the two above-described colors in addition to the three primary color inks of subtractive color mixtures comprising yellow, magenta, and cyan, making it possible to provide printed matter that has a wide color reproduction range, high color saturation, and a glossy look.

Specifically, when glossy paper is used as a recording medium, the ink quantity deposited can be limited to an amount such that the glossy look of the printed matter is not lost, and printed matter having high color saturation and high glossiness can be obtained with the ink set of the present embodiment. Printed matter with high color saturation cannot be obtained with conventional ink sets under printing conditions in which the inks are deposited in limited amounts in order to prevent such a reduction in glossiness.

When a matted recording medium or plain paper (recording medium whose fibers are exposed on the recording surface) is used as a recording medium, printed matter with high color saturation can be obtained by using the ink set of the present embodiment even if the inks in the three primary color ink set of the subtractive color mixture are deposited in limited amounts.

The ink set of the present embodiment is highly reliable as an ink set for inkjet recording despite the wide color reproduction range because the pigment concentration of each of the inks is insufficient to cause clogging or other problems in the nozzles of the printer head.

The inkjet recording method of the present invention will now be described based on embodiments in which the above-described ink set is used in preferred embodiments thereof.

The inkjet recording method of the present embodiment is a method in which a mixed color portion is formed from ink (A) and/or ink (B) and from at least two types of inks other than ink (A) and/or ink (B) when droplets of each of a plurality of color inks are ejected, these droplets are mixed on a recording medium, and a mixed color portion comprising a single color or secondary or higher color is formed on the recording medium.

In other words, the ink jet recording method of the present embodiment is characterized by using at least two types of color inks selected from yellow, magenta, and cyan, and one type or two types of special color inks selected from the two color inks described above when a mixed color portion having secondary and higher color is formed on a recording medium, and this method is identical to a common inkjet recording method when ink is deposited on a recording medium in a single color.

Specifically, at least ink (A) and/or ink (B) as well as the color inks yellow, magenta, and cyan are used when a mixed color portion is formed such that the chromaticity indices $a^*$ and $b^*$ fall within the ranges $a^*$=about −50 to about 50, and $b^*$=about −50 to about 50, respectively; that is, when a mixed color portion in formed with a single color (gray, for example) belonging to a hue group between white and black. These may be used appropriately when the ink set comprises inks other than the five aforementioned types of ink; for example, black, light magenta, light cyan, and other color inks.

The amount in which the special color inks (ink (A) and/or ink (B)) are deposited per unit area should preferably be kept between 10 and 90 wt %, and more preferably between 30 and 50 wt %, of the total amount in which the ink is deposited to form the mixed color portion when the mixed color portion is composed of a single color that belongs to a hue group between white and black, as described above.

At least ink (A) and the two color inks yellow and magenta are used when a mixed color portion is formed such that the chromaticity indices $a^*$ and $b^*$ fall within the ranges $a^*$=about −40 to about 90, and $b^*$=about −40 to about 100, respectively; that is, when a mixed color portion is formed with a single color (orange or red, for example) belonging to a hue group between yellow and magenta. In this case, the amount in which ink (A) is deposited per unit area should preferably be kept between 10 and 90 wt %, and more preferably between 30 and 50 wt %, of the total amount in which the ink is deposited to form the mixed color portion.

At least ink (B) and the two color inks magenta and cyan are used when a mixed color portion is formed such that the chromaticity indices $a^*$ and $b^*$ fall within the ranges $a^*$=about −50 to about 100, and $b^*$=about −10 to about −80, respectively; that is, when a mixed color portion is formed with a single color (violet or blue, for example) belonging to a hue group between magenta and cyan. In this case, the amount in which ink (B) is deposited per unit area should preferably be kept between 10 and 90 wt %, and more preferably between 30 and 50 wt %, of the total amount in which the ink is deposited to form the mixed color portion.

In accordance with the inkjet recording method of the present embodiment, it is possible to provide printed matter in which the hue remains substantially unchanged even when a different illuminating light source is used; that is, to provide high-quality printed matter with reduced metamerism, because the inks are used in combinations in the above-described manner when a mixed color portion having secondary and higher color is formed.

Described more specifically, if, for example, a mixed color portion using solely the three YMC color inks yellow, magenta, and cyan is formed, the spectral characteristics of the mixed color portion result in the appearance of three peaks, such as those shown by the solid lines in FIG. 1, and the hues appear to differ (the metamerism phenomenon) depending on the illuminating light source, particularly when the color saturation $C^*$ of the mixed color portion is low. In contrast, by forming a mixed color portion using, for example, ink (A) and ink (B) in addition to the YMC inks according to the inkjet recording method of the present embodiment, it is possible to reduce metamerism because the spectral characteristics of the mixed color portion possess the three aforementioned peaks together with new peaks (dotted-line portion) that fill the valleys between these peaks, creating a condition in which the peaks appear as one.

The inkjet recording method of the present embodiment may be applied without any particular restrictions to recording media normally used in this type of recording method, and is particularly effective with plain paper. In other words, plain paper has a property whereby any contact with a large quantity of water results in the destruction of hydrogen bonds between the cellulose fibers in the contact portion, and the contact portion distends, causing paper wrinkles and other deformations. Whereas inkjet recording methods performed using the conventional ink set described in the above-stated Japanese Patent Application Laid-open No. 2000-351928 produce such paper wrinkles, particularly in mixed color portions of secondary and higher color, the inkjet recording method of the present embodiment allows paper wrinkles and other deformations to be controlled together with coloring on the reverse surface of the paper because highly colored characters and/or images can be formed with a relatively small amount of ink deposited when the mixed color portion is formed.

The present invention is not limited by the above described embodiments and may be modified in a variety of ways insofar as the spirit thereof is preserved.

The ink set of the present invention may be any ink set comprising at least the three color inks yellow, magenta, and cyan, as well as ink (A) and/or ink (B) as special color inks, and may also comprise, in addition to these inks, inks such as the aforementioned black ink and one, two, or more types selected from yellow ink, magenta ink, and cyan ink other than the yellow ink, magenta ink, and cyan ink related to the present invention.

The inkjet recording method of the present invention may also be an inkjet recording method for forming a mixed color portion with ink (A) and/or ink (B), and at least any one color of selected from the aforementioned yellow ink, magenta ink, cyan ink, and black ink.

EMBODIMENTS

The present invention is described in detail below with embodiments and experimental examples of the present invention, but the present invention is not limited in any way by these embodiments.

Embodiment 1

The three primary color inks yellow, magenta, and cyan were each prepared according to conventional practice, as were the special color ink A1 and special color ink B1 described below. Specifically, the ink was prepared by dispersing colorant components together with dispersant components, then admixing other components, and filtering out insoluble components greater than a fixed size. The obtained inks were brought together to form ink set 1.

| (Yellow ink) | |
|---|---|
| C.I. Pigment Yellow 74 | 3.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-hexanediol | 5.0 wt % |
| Olfine E1010 | 0.5 wt % |
| Deionized water | Remainder |
| Total | 100.0 wt % |
| (Magenta ink) | |
| C.I. Pigment Red 202 | 1.5 wt % |
| Dispersing agent (styrene-acrylic acid copolymer) | 0.5 wt % |

| -continued | |
|---|---|
| Glycerin | 15.0 wt % |
| Ethylene glycol | 5.0 wt % |
| 2-Pyrrolidone | 2.0 wt % |
| 1,2-hexanediol | 5.0 wt % |
| Olfine E1010 | 0.5 wt % |
| Deionized water | Remainder |
| Total | 100.0 wt % |
| (Cyan ink) | |
| C.I. Pigment Blue 15:3 | 1.5 wt % |
| Dispersing agent (styrene-acrylic acid copolymer) | 0.5 wt % |
| Glycerin | 15.0 wt % |
| Ethylene glycol | 5.0 wt % |
| 2-Pyrrolidone | 2.0 wt % |
| 1,2-hexanediol | 5.0 wt % |
| Olfine E1010 | 0.5 wt % |
| Deionized water | Remainder |
| Total | 100.0 wt % |
| (Special color ink A1) | |
| C.I. Pigment Red 178 | 2.0 wt % |
| Dispersing agent (styrene-acrylic acid copolymer) | 0.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B1) | |
| C.I. Pigment Violet 23 | 2.0 wt % |
| Dispersing agent (styrene-acrylic acid copolymer) | 0.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Black ink) | |
| C.I. Pigment Black 7 | 1.5 wt % |
| Dispersing agent (styrene-acrylic acid copolymer) | 1.5 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

It should be noted that the ink weight at 100% duty was set to between 14 and 16 mg/inch$^2$ in the above-described inks.

Embodiment 2

Ink set 2 having the same composition as ink set 1 was produced, except that the special color ink A2 and special color ink B2 described below were used in place of the special color ink A1 and special color ink B1 used for ink set 1 (Embodiment 1).

| (Special color ink A2) | |
|---|---|
| C.I. Pigment Red 177 | 2.0 wt % |
| Dispersing agent (styrene-acrylic acid copolymer) | 0.7 wt % |

| -continued | |
|---|---|
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B2) | |
| C.I. Pigment Violet 23 | 2.0 wt % |
| Dispersing agent (styrene-acrylic acid copolymer) | 0.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 3

Ink set 3 having the same composition as ink set 1 was produced, except that the special color ink A3 and special color ink B3 described below were used in place of the special color ink A1 and special color ink B1 used for ink set 1 (Embodiment 1).

| (Special color ink A3) | |
|---|---|
| C.I. Pigment Red 264 | 2.0 wt % |
| Dispersing agent (styrene-acrylic acid copolymer) | 0.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B3) | |
| C.I. Pigment Violet 23 | 2.0 wt % |
| Dispersing agent (styrene-acrylic acid copolymer) | 0.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 4

Ink set 4 having the same composition as ink set 1 was produced, except that the special color ink A4 and special color ink B4 described below were used in place of the special color ink A1 and special color ink B1 used for ink set 1 (Embodiment 1).

| (Special color ink A4) | |
|---|---|
| C.I. Pigment Red 149 | 2.5 wt % |
| Dispersing agent (styrene-acrylic acid copolymer) | 0.8 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B4) | |
| C.I. Pigment Violet 23 | 2.0 wt % |
| Dispersing agent (styrene-acrylic acid copolymer) | 0.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 5

Ink set 5 having the same composition as ink set 4 was produced, except that C.I. Pigment Yellow 128 was used in place of C.I. Pigment Yellow 74 (yellow ink) used for ink set 4 (Embodiment 4).

Embodiment 6

Ink set 6 having the same composition as ink set 1 was produced, except that C.I. Pigment Yellow 147 was used in place of C.I. Pigment Yellow 74 (yellow ink) used for ink set 1 (Embodiment 1).

Embodiment 7

Ink set 7 having the same composition as ink set 1 was produced, except that C.I. Pigment Yellow 110 was used in place of C.I. Pigment Yellow 74 (yellow ink) used for ink set 1 (Embodiment 1).

Embodiment 8

Ink set 8 having the same composition as ink set 1 was produced, except that 3 wt % of C.I. Pigment Orange 43 was used in place of 2.0 wt % of C.I. Pigment Orange 178 for special color ink A1 used for ink set 1 (Embodiment 1).

Embodiment 9

Ink set 9 having the same composition as ink set 1 was produced, except that 3 wt % of C.I. Pigment Blue 60 was used in place of 2.0 wt % of C.I. Pigment Violet 23 for special color ink B1 used for ink set 1 (Embodiment 1).

Comparative Example 1

Three color inks having the compositions described below were prepared with the same method as in embodiment 1, and these were brought together to form ink set 10.

| (Yellow ink) | |
|---|---|
| C.I. Pigment Yellow 74 | 5.0 wt % |
| Dispersing agent (styrene-acrylic acid copolymer) | 1.7 wt % |
| Glycerin | 15.0 wt % |
| Ethylene glycol | 5.0 wt % |
| 2-Pyrrolidone | 2.0 wt % |

-continued

| | |
|---|---|
| 1,2-Hexanediol | 5.0 wt % |
| Olfine E1010 | 0.5 wt % |
| Deionized water | Remainder |
| Total | 100.0 wt % |

(Magenta ink)

| | |
|---|---|
| C.I. Pigment Red 202 | 5.0 wt % |
| Dispersing agent (styrene-acrylic acid copolymer) | 1.7 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Cyan ink)

| | |
|---|---|
| C.I. Pigment Blue 15:3 | 4.0 wt % |
| Dispersing agent (styrene-acrylic acid copolymer) | 1.3 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Black ink)

| | |
|---|---|
| C.I. Pigment Black 7 | 5.0 wt % |
| Dispersing agent (styrene-acrylic acid copolymer) | 1.5 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

EXPERIMENTAL EXAMPLE

Evaluation of GAMUT Volume

Recorded matter was obtained by printing at 720×720 dpi and 100% duty (in the case of a single color) or 120% duty (in the case of a mixture of any of the above-described six colors, although the above-described four colors were arbitrarily mixed in the comparative examples) on PM photographic paper (manufactured by Seiko Epson) with an inkjet printer PM900C (manufactured by Seiko Epson) using the ink sets described in embodiments 1 to 9 and comparative example 1.

Gamut volume was measured with a D50 light source without a filter at an angle of visibility of 2° using a Gretas Macbeth SPM50 manufactured by Gretag, and the volume was calculated by assuming that the volume of a cube comprising $L^*=1$, $a^*=1$, and $b^*=1$ was equal to 1 in the $L^*a^*b$ calorimetric system established by CIE. The results were evaluated based on the standards noted below, and the results were presented in Table 1.
Evaluation A: About 650,000 or greater
Evaluation B: About 650,000 or less
(Evaluation of Graininess)
Printing was performed at 5% duty and 10% duty on PM photographic paper (manufactured by Seiko Epson) with an inkjet printer PM900C (manufactured by Seiko Epson) using the ink sets described in embodiments 1 to 9 and comparative example 1, the printed portions were visually evaluated, and the results were presented in Table 1.
Evaluation A: Grains are difficult to identify
Evaluation B: Grains are easily identified
(Evaluation of Imparted Glossiness)
Printing was performed at 80% duty on PM photographic paper (manufactured by Seiko Epson) with an inkjet printer PM900C (manufactured by Seiko Epson) using the ink sets described in embodiments 1 to 9 and comparative example 1, the printed portions were exposed to fluorescent light from a distance of about 2 m, and the results were presented in Table 1.
Evaluation A: Illumination shape observable
Evaluation B: Illumination shape unobservable

TABLE 1

| | Gamut Volume | Graininess | Glossiness |
|---|---|---|---|
| Embodiment 1 | A | A | A |
| Embodiment 2 | A | A | A |
| Embodiment 3 | A | A | A |
| Embodiment 4 | A | A | A |
| Embodiment 5 | A | A | A |
| Embodiment 6 | A | A | A |
| Embodiment 7 | A | A | A |
| Embodiment 8 | A | A | A |
| Embodiment 9 | A | A | A |
| Comparative Example 1 | B | B | B |

Embodiment 10

The three primary color inks yellow, magenta, and cyan were prepared according to conventional practice, as were two special color inks A1 and B1. Specifically, the inks were prepared by dispersing colorant components together with dispersant components, then admixing other components, and filtering out insoluble components greater than a fixed size. The obtained inks were brought together to form ink set 11.

(Yellow ink)

| | |
|---|---|
| C.I. Pigment Yellow 128 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Magenta ink)

| | |
|---|---|
| C.I. Pigment Red 122 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Cyan ink)

| | |
|---|---|
| C.I. Pigment Blue 15:3 | 1.5 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |

-continued

| | |
|---|---|
| 1,2-Hexanediol | 5.0 wt % |
| Olfine E1010 | 0.5 wt % |
| Deionized water | Remainder |
| Total | 100.0 wt % |
| (Special color ink A1) | |
| C.I. Pigment Orange 43 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B1) | |
| C.I. Pigment Violet 23 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 11

Ink set 12 having the same composition as ink set 11 was produced, except that the special color ink A2 and special color ink B2 described below were used in place of the special color ink A1 and special color ink B1 used for ink set 11 (Embodiment 10).

| | |
|---|---|
| (Special color ink A2) | |
| C.I. Pigment Red 178 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B2) | |
| C.I. Pigment Blue 60 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 12

Ink set 13 having the same composition as ink set 11 was produced, except that the special color ink A3 and special color ink B3 described below were used in place of the special color ink A1 and special color ink B1 used for ink set 11 (Embodiment 10).

| | |
|---|---|
| (Special color ink A3) | |
| C.I. Pigment Red 178 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink B3) | |
| C.I. Pigment Violet 23 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Five ink colors with the compositions described below were each prepared with the same method as embodiment 10, and these were brought together to form ink set 14.

| | |
|---|---|
| (Yellow ink) | |
| C.I. Pigment Yellow 74 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Magenta ink) | |
| C.I. Pigment Red 122 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Cyan ink) | |
| C.I. Pigment Blue 15:3 | 5.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Special color ink A4) | |
| C.I. Pigment Orange 43 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |

-continued

| | |
|---|---|
| 1,2-Hexanediol | 5.0 wt % |
| Olfine E1010 | 0.5 wt % |
| Deionized water | Remainder |
| Total | 100.0 wt % |

(Special color ink B4)

| | |
|---|---|
| C.I. Pigment Violet 23 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 14

Ink set 15 having the same composition as ink set 14 was produced, except that the special color ink A5 and special color ink B5 described below were used in place of the special color ink A4 and special color ink B4 used for ink set 14 (Embodiment 13).

(Special color ink A5)

| | |
|---|---|
| C.I. Pigment Red 178 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Special color ink B5)

| | |
|---|---|
| C.I. Pigment Blue 60 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 15

Five ink colors with the compositions described below were each prepared with the same method as embodiment 10, and these were brought together to form ink set 16.

(Yellow ink)

| | |
|---|---|
| C.I. Pigment Yellow 128 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |

-continued

| | |
|---|---|
| 1,2-Hexanediol | 5.0 wt % |
| Olfine E1010 | 0.5 wt % |
| Deionized water | Remainder |
| Total | 100.0 wt % |

(Magenta ink)

| | |
|---|---|
| C.I. Pigment Red 122 | 3.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Cyan ink)

| | |
|---|---|
| C.I. Pigment Blue 15:3 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Special color ink A6)

| | |
|---|---|
| C.I. Pigment Orange 43 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

(Special color ink B6)

| | |
|---|---|
| C.I. Pigment Violet 23 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Embodiment 16

Ink set 17 having the same composition as ink set 16 was produced, except that the special color ink A7 and special color ink B7 described below were used in place of the special color ink A6 and special color ink B6 used for ink set 16 (Embodiment 15).

(Special color ink A7)

| | |
|---|---|
| C.I. Pigment Red 178 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |

-continued

| | |
|---|---|
| 1,2-Hexanediol | 5.0 wt % |
| Olfine E1010 | 0.5 wt % |
| Deionized water | Remainder |
| Total | 100.0 wt % |
| (Special color ink B7) | |
| C.I. Pigment Blue 60 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Comparative Example 2

The three ink colors having the compositions described below were each prepared with the same method as in embodiment 10, and these were brought together to form ink set 18.

| | |
|---|---|
| (Yellow ink) | |
| C.I. Pigment Yellow 74 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Magenta ink) | |
| C.I. Pigment Red 122 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Cyan ink) | |
| C.I. Pigment Blue 15:3 | 5.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Comparative Example 3

Three ink colors having the compositions described below were each prepared with the same method as in embodiment 10, and these were brought together to form ink set 19.

| | |
|---|---|
| (Yellow ink) | |
| C.I. Pigment Yellow 128 | 4.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Magenta ink) | |
| C.I. Pigment Red 122 | 3.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Cyan ink) | |
| C.I. Pigment Blue 15:3 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

Comparative Example 4

Three ink colors having the compositions described below were each prepared with the same method as in embodiment 10, and these were brought together to form ink set 20.

| | |
|---|---|
| (Yellow ink) | |
| C.I. Pigment Yellow 128 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Magenta ink) | |
| C.I. Pigment Red 122 | 2.0 wt % |
| Dispersing agent (styrene-acrylic acid copolymer) | 1.0 wt % |
| Glycerin | 15.0 wt % |
| Ethylene glycol | 5.0 wt % |
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |
| (Cyan ink) | |
| C.I. Pigment Blue 15:3 | 1.5 wt % |
| Dispersing agent (styrene-acrylic acid copolymer) | 1.0 wt % |
| Glycerin | 15.0 wt % |
| Ethylene glycol | 5.0 wt % |

-continued

| | |
|---|---|
| 2-Pyrrolidone | 2.0 wt % |
| 1,2-Hexanediol | 5.0 wt % |
| Olfine E1010 | 0.5 wt % |
| Deionized water | Remainder |
| Total | 100.0 wt % |

EXPERIMENTAL EXAMPLES

Creation of Printed Matter and Measurement of Color Saturation and Other Parameters Thereof Printed matter was obtained on a recording medium (trade name: PM Photographic Paper, manufactured by Seiko Epson) at 1,440×720 dpi and 100% duty by using an inkjet printer (trade name: MC-2000, manufactured by Seiko Epson) and the above-described ink sets 11 to 20. "Duty" is defined by formula (A) below and is indicated in units of calculated value D. "100% duty" refers to the maximum ink weight of a single color per pixel.

$D$=(Actual number of printed dots)/(Longitudinal resolution× Transverse resolution)×100 (duty)  (A)

The optical densities (OD) of each type of printed matter thus obtained were measured with a D65 light source at an angle of visibility of 2° using an SPM50 manufactured by Gretag, and calculations were made to determine the L*, a*, and b* defined in the CIELAB color space, the hue angle $\angle H°$ [=$\tan^{-1}$ (b*/a*)+180 (if a*<0), or $\angle H°$=$\tan^{-1}$ (b*/a*)+ 360 (if a*>0)], and the color saturation C* [=$((a*)^2+(b*)^2)^{1/2}$].

Figure 2:
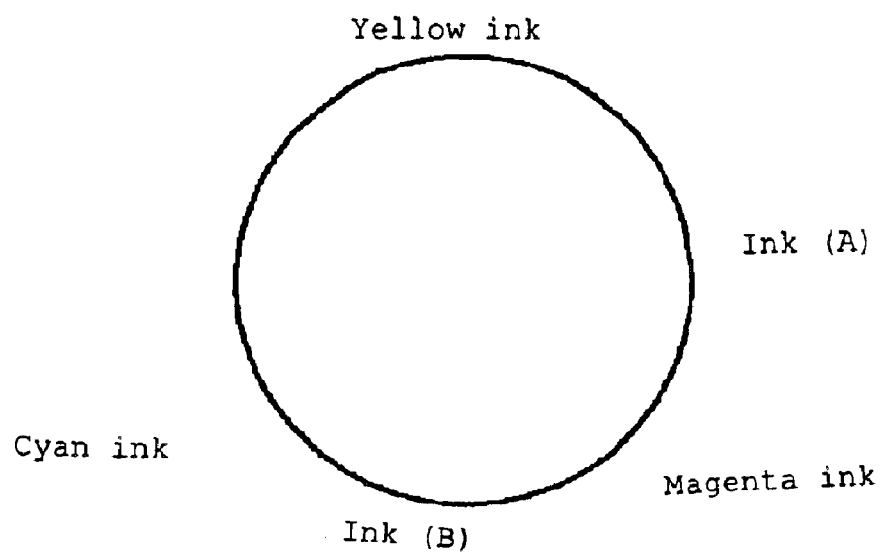
FIG. 2 is a diagram depicting combinations of mixed colors when printed matter is created in the embodiments.

Evaluated colors: These colors comprised a single color at 100% duty formed by a single color ink, and a mixed color at 100% duty formed by two adjacent color inks, each at 50% duty, on the circle shown in FIG. 2.

Effectiveness of Special Color Inks

Measurements were conducted to determine the hue angle $\angle H°$ and the color saturation C* of a 100% duty mixed color portion formed with any two of the three primary color inks YMC on printed matter created using the ink sets of the embodiments. Measurements were then conducted to determine the quantities in which the special ink needed to be deposited in order to obtain the same hue angle $\angle H°$ and color saturation C*. The results are shown in Tables 2 to 5 below.

TABLE 2

| Ink set No. | $\angle H°$ | C* | Magenta ink ($J_{1M}$) | Yellow ink ($I_Y$) | $J_{1M} + I_Y$ | Special inks*1 A2, A5, and A7 |
|---|---|---|---|---|---|---|
| 12 | 19 | 63 | 60% | 40% | 100% | 38% |
| 15 | 27 | 77 | 76% | 24% | 100% | 58% |
| 17 | 23 | 73 | 67% | 33% | 100% | 53% |

*1C.I. Pigment Red 178 (concentration: 2%)

TABLE 3

| Ink set No. | $\angle H°$ | C* | Magenta ink ($J_{1M}$) | Yellow ink ($I_Y$) | $J_{1M} + I_Y$ | Special inks*2 A1, A4, and A6 |
|---|---|---|---|---|---|---|
| 11 | 64 | 60 | 20% | 80% | 100% | 28% |
| 14 | 62 | 87 | 24% | 76% | 100% | 55% |
| 16 | 64 | 72 | 30% | 70% | 100% | 37% |

*2C.I. Pigment Orange 43 (concentration: 2%)

TABLE 4

| Ink set No. | $\angle H°$ | C* | Magenta ink ($J_{2M}$) | Cyan ink ($K_C$) | $J_{2M} + K_C$ | Special inks*3 B2, B5, and B7 |
|---|---|---|---|---|---|---|
| 12 | 292 | 76 | 40% | 60% | 100% | 48% |
| 15 | 288 | 70 | 12% | 88% | 100% | 40% |
| 17 | 292 | 76 | 38% | 72% | 100% | 54% |

*3C.I. Pigment Blue 60 (concentration: 4%)

TABLE 5

| Ink set No. | $\angle H°$ | C* | Magenta ink ($J_{2M}$) | Cyan ink ($K_C$) | $J_{2M} + K_C$ | Special inks*4 B1, B4, and B6 |
|---|---|---|---|---|---|---|
| 11 | 313 | 85 | 81% | 19% | 100% | 28% |
| 14 | 312 | 75 | 77% | 23% | 100% | 18% |
| 16 | 313 | 86 | 76% | 24% | 100% | 34% |

*4C.I. Pigment Blue 23 (concentration: 2%)

As is clear from Tables 2 to 5, the color saturation C* of the hue angle $\angle H°$ at 100% duty formed using any two of the three primary color inks YMC can be obtained at 60% duty or less by using the special inks A and B related to the present invention.

Evaluation of Color Reproducibility

The surface area of the part of each of the aforementioned printed matter that included the origin of a graph drawn in accordance with the a* and b* values of the evaluation colors was calculated, and the resulting value was assumed to represent the color saturation area. The results are shown in Table 6 below. It can be seen that the greater the value of the color saturation area, the greater the color reproduction range of an ink set.

Evaluation of Imparted Glossiness

The glossiness of each of the aforementioned types of printed matter was measured using an ND10 filter and GP-200 (manufactured by Murakami Color Research Laboratory) at a voltage of 12 V, a power of 50 W, an incident light beam aperture of ϕ1 mm, a reflective light beam aperture of ϕ1.5 mm, an incident angle of 45°, and a fan angle of 0°, with the standard mirror plate being set to 85. The maximum glossiness values of evaluated colors were averaged, and the resulting values were used as mean gloss values. The results are shown in Table 6 below. It can be seen that the greater the value of the gloss value, the better the imparted glossiness of an ink set.

TABLE 6

|  | Ink set No. | Color saturation area | Mean gloss value |
|---|---|---|---|
| Embodiment 10 | 11 | 21300 | 93 |
| Embodiment 11 | 12 | 19500 | 80 |
| Embodiment 12 | 13 | 19900 | 90 |
| Embodiment 13 | 14 | 21100 | 45 |
| Embodiment 14 | 15 | 21000 | 43 |
| Embodiment 15 | 16 | 21100 | 64 |
| Embodiment 16 | 17 | 20800 | 63 |
| Comparative Example 2 | 18 | 19900 | 40 |
| Comparative Example 3 | 19 | 19300 | 52 |
| Comparative Example 4 | 20 | 17800 | 87 |

As is clear from the results shown in Table 6, the ink sets of embodiments 10 to 16 comprise the special inks (A) and (B), so a greater color saturation area can be obtained and the color reproducibility is superior to that provided by the ink sets comprising the three primary color inks in comparative examples 2 to 4. Furthermore, the optical density (OD value) of yellow ink on a recording medium is between 1.7 and 1.9, the optical density (OD value) of magenta ink on a recording medium is between 1.2 and 2.0, and the optical density (OD value) of cyan ink on a recording medium is between 2.0 and 2.5, indicating that the ink sets in embodiments 10 to 12 are capable of providing printed matter having an excellent glossy look.

Embodiment 17

The following inks were prepared in the same manner as in embodiment 1, and brought together to form ink set 21: a yellow ink having the same composition as the yellow ink of embodiment 1, except that the C.I. Pigment Yellow 74 was set to 6.0 wt % (solids), and the dispersing agent to 1.8 wt %; a magenta ink having the same composition as the magenta ink of embodiment 1, except-that the C.I. Pigment Red 202 was set to 6.0 wt % (solids), and the dispersing agent to 1.8 wt %; a cyan ink having the same composition as the cyan ink of embodiment 1, except that the C.I. Pigment Blue 15:3 was set to 4.0 wt % (solids), and the dispersing agent to 1.2 wt %; a red ink having the same composition as the special color ink A1 of embodiment 1, except that the C.I. Pigment Red 178 was set to 6.0 wt % (solids), and the dispersing agent to 1.8 wt %; and a violet ink having the same composition as the special color ink B1 of embodiment 1, except that the C.I. Pigment Violet 23 was set to 6.0 wt % (solids), and the dispersing agent to 1.8 wt %.

EXPERIMENTAL EXAMPLE

Evaluation by ISO 400

An arbitrary image was printed according to ISO 400, and the result was evaluated. The evaluation was conducted using ink set 21 and the above-described ink sets 1 to 10. The evaluation standards are noted below.
Evaluation A: Illumination shape observable
Evaluation B: Illumination shape unobservable The results of the evaluation showed that ink set 21 and ink sets 1 to 9 (embodiments 1 to 9) were evaluated as "A", and ink set 10 (comparative example 1) was evaluated as "B." It was thereby found that by increasing the quantity of pigment contained in the red ink and violet ink, it is possible to form an image and to improve glossiness at low duty.

When ink set 21 was evaluated for graininess and imparted glossiness in the same manner as that described above, the graininess and imparted glossiness were evaluated as "B."

Embodiment 18

(Magenta Ink (1))

A magenta ink (1) having the same composition as the magenta ink in embodiment 1 was produced, except that 1.5 wt % (solids) of C.I. Pigment Red 202 was used in place of 2.0 wt % (solids) of C.I. Pigment Violet 19.

(Cyan Ink (2))

A cyan ink (2) having the same composition as the magenta ink in embodiment 1 was produced, except that 1.5 wt % (solids) of C.I. Pigment Blue 15:3 was used in place of 1.5 wt % (solids) of C.I. Pigment Blue 15:4.

(Violet Ink (3))

A violet ink (3) with the same composition as the special color ink B1 in embodiment 1 was produced, except that 2.0 wt % (solids) of C.I. Pigment Violet 23 was used in place of 3.0 wt % (solids) of C.I. Pigment Violet 23.

(Violet Ink (4))

A violet ink (4) with the same composition as the special color ink B1 in embodiment 1 was produced, except that 2.0 wt % (solids) of C.I. Pigment Violet 23 was used in place of 3.5 wt % (solids) of C.I. Pigment Blue 60.

(Red Ink (5))

A red ink (5) with the same composition as the special color ink A4 in embodiment 4 was produced, except that 2.5 wt % (solids) of C.I. Pigment Red 149 was used in place of 3.5 wt % (solids) of C.I. Pigment Red 149.

Measurement of the Absorption Area of Each Ink

Measurement was conducted using a Hitachi automatic recording spectrophotometer (model U3300) under the following measurement conditions: a scan speed of 600 nm/min, a 2.0-nm slit, a photomultiplier voltage on automatic control, and an automatic sampling interval.

The baseline was established and measured on both the sample and reference sides by adding pure water to a quartz cell (length 1 cm×width 1 cm×height 4 cm, 4 mL capacity).

The sample measurement was conducted by leaving the reference side cell in the same state, and by adding a diluted ink solution prepared as described below to the sample side cell. The diluted solution was obtained by transferring 1.00 g of each ink to a 1-L beaker, and immediately adding pure water to bring the total to 1 kg.

The results are shown in Table 7.

TABLE 7

| Ink | 400 nm~ 500 nm | 500 nm~ 600 nm | 600 nm~ 700 nm | 400 nm~500 nm/ 500 nm~600 nm | 500 nm~600 nm/ 600 nm~700 nm |
|---|---|---|---|---|---|
| Yellow ink of embodiment 5 | 46 | — | — | — | — |
| Yellow ink of embodiment 6 | 38 | — | — | — | — |
| Yellow ink of embodiment 7 | 53 | — | — | — | — |

TABLE 7-continued

| Ink | 400 nm~500 nm | 500 nm~600 nm | 600 nm~700 nm | 400 nm~500 nm/ 500 nm~600 nm | 500 nm~600 nm/ 600 nm~700 nm |
|---|---|---|---|---|---|
| Yellow ink of embodiment 1 | 166 | — | — | — | — |
| Magenta ink of embodiment 1 | — | 25 | — | — | — |
| Magenta ink (1) of embodiment 18 | — | 30 | — | — | — |
| Cyan ink (2) of embodiment 18 | — | — | 68 | — | — |
| Cyan ink of embodiment 1 | — | — | 66 | — | — |
| Ink (A) of embodiment 8 | 97 | 59 | — | 1.64 | — |
| Ink (A) of embodiment 4 | 73 | 45 | — | 1.62 | — |
| Red ink (5) of embodiment 18 | 102 | 63 | — | 1.62 | — |
| Ink (A) of embodiment 2 | 48 | 67 | — | 0.72 | — |
| Ink (A) of embodiment 1 | 53 | 62 | — | 0.85 | — |
| Ink (A) of embodiment 3 | 55 | 32 | — | 1.72 | — |
| Ink (B) of embodiment 1 | — | 109 | 30 | — | 3.63 |
| Violet ink (3) of embodiment 18 | — | 163 | 45 | — | 3.62 |
| Violet ink (4) of embodiment 18 | — | 70 | 83 | — | 0.84 |

(In the table, the numbers refer to abs · nm.)

INDUSTRIAL APPLICABILITY

In accordance with the ink set and inkjet recording method of the present invention, printed matter having a wide color reproduction range, high color saturation, good graininess, and an adequate glossy look can be provided. Also, in accordance with the inkjet recording method of the present invention, printed matter that has high image quality and reduced metamerism can be provided.

What is claimed is:

1. An ink set comprising at least three color inks: (a) a yellow ink comprising at least one pigment selected from the group consisting of C.I. Pigment Yellow 1, 2, 3, 12, 13, 14, 16, 17, 73, 74, 75, 83, 93, 95, 97, 98, 109, 110, 114, 128, 129, 138, 139, 147, 150, 151, 154, 155, 180, and 185; (b) a magenta ink comprising at least one pigment selected from the group consisting of C.I. Pigment Red 5, 7, 12, 48 (Ca), 57 (Ca), 57:1, 112, 122, 123, 168, 184, 202, and 209, and C.I. Pigment Violet 19; and (c) a cyan ink comprising at least one pigment selected from the group consisting of C.I. Pigment Blue 1, 2, 3, 15:3, 15:4, 15:34, 16, 22, and 60, and C.I. Vat Blue 4 and 60; wherein the, yellow ink has a hue angle H°, as defined in the CIELAB color space on a recording medium, in a range of about 80° to about 110°; the magenta ink has a hue angle H° in a range of about 330° to about 360°; and the cyan ink has a hue angle H° in a range of about 230° to about 260°; the ink set further comprising ink (A) which comprises at least one pigment selected from the group consisting of C.I. Pigment Orange 5, and 62, and C.I. Pigment Red 17, 49:2, 112, 149, 177, 178, 188, 255, and 264, and/or ink (B) which comprises at least one pigment selected from the group consisting of C.I. Pigment Blue 60, and C.I. Pigment Violet 3, 19, 23, 32, 36, and 38, wherein Ink (A) is an ink whose hue angle H° is about 0° to about 80°; and Ink (B) is an ink whose hue angle H° is about 260° to about 330° and wherein the hue angle H° is calculated from H°=tan$^{-1}$ (b*/a*)+180, where a*<0, or H°=tan$^{-1}$ (b*/a*)+360, where a*>0 wherein a* and b* express chromaticity indices defined in the CIELAB color space.

2. The ink set according to claim 1, wherein the brightness of inks (A) and (B) is lower than the brightness of the magenta and cyan inks, and the color saturation of inks (A) and (B) is higher than the color saturation of the magenta and cyan inks.

3. An ink set comprising (a) a yellow ink comprising at least one pigment selected from the group consisting of C.I. Pigment Yellow 1, 2, 3, 12, 13, 14, 16, 17, 73, 74, 75, 83, 93, 95, 97, 98, 109, 110, 114, 128, 129, 138, 139, 147, 150, 151, 154, 155, 180, and 185, said yellow ink having an absorption spectrum in which the absorption area between 400 nm and 500 nm is no less than 30 abs×nm and no more than 350 abs×nm, (b) a magenta ink comprising at least one pigment selected from the group consisting of C.I. Pigment Red 5, 7, 12, 48 (Ca), 57 (Ca), 57:1, 112, 122, 123, 168, 184, 202, and 209, and C.I. Pigment Violet 19, said magenta ink having an absorption spectrum in which the absorption area between 500 nm and 600 nm is no less than 20 abs×nm and no more than 200 abs×nm, (c) a cyan ink comprising at least one pigment selected from the group consisting of C.I. Pigment Blue 1, 2, 3, 15:3, 15:4, 15:34, 16, 22, and 60, and C.I. Vat Blue 4 and 60, said cyan ink having an absorption spectrum in which the absorption area between 600 nm and 700 nm is no less than 50 abs×nm and no more than 400 abs×nm, and (d) ink (A) which comprises at least one pigment selected from the group consisting of C.I. Pigment Orange 5 and 62, and C.I. Pigment Red 17, 49:2, 112, 149, 177, 178, 188, 255, and 264 and/or ink (B) which comprises at least one pigment selected from the group consisting of C.I. Pigment Blue 60, and C.I. Pigment Violet 3, 19, 23, 32, 36, and 38, wherein Ink (A) is an ink whose absorption area between 500 nm and 600 nm is equal to or greater than the absorption area between 500 nm and 600 nm of the magenta ink and Ink (B) is an ink whose absorption area between 500 nm and 600 nm is equal to or greater than the absorption area between 600 nm and 700 nm of the cyan ink.

4. The ink set according to claim 3, wherein the absorption area between 500 nm and 600 nm of ink (A) is no less than 1.0 times and no more than 3.5 times the absorption area between 500 nm and 600 nm of the magenta ink.

5. The ink set according to claim 3, wherein the absorption area between 500 nm and 600 nm of ink (B) is no less than 1.0 times and no more than 3.0 times the absorption area between 600 nm and 700 nm of the cyan ink.

6. An ink set comprising (a) a yellow ink comprising at least one pigment selected from the group consisting of C.I. Pigment Yellow 1, 2, 3, 12, 13, 14, 16, 17, 73, 74, 75, 83, 93, 95, 97, 98, 109, 110, 114, 128, 129, 138, 139, 147, 150, 151, 154, 155, 180, and 185, said yellow ink having an absorption spectrum in which the absorption area between 400 nm and 500 nm is no less than 30 abs×nm and no more than 350 abs×nm, (b) a magenta ink comprising at least one pigment selected from the group consisting of C.I. Pigment Red 5, 7, 12, 48 (Ca), 57 (Ca), 57:1, 112, 122, 123, 168, 184, 202, and 209, and C.I. Pigment Violet 19, said magenta ink having an absorption spectrum in which the absorption area between 500 nm and 600 nm is no less than 20 abs×nm and no more than 200 abs×nm, (c) a cyan ink comprising at least one pigment selected from the group consisting of C.I. Pigment Blue 1, 2, 3, 15:3, 15:4, 15:34, 16, 22, and 60, and C.I. Vat Blue 4 and 60, said cyan ink having an absorption spectrum in which the absorption area between 600 nm and 700 nm is no less than 50 abs×nm and no more than 400 abs×nm, and (d) ink (A) which comprises at least one pigment selected from the group consisting of C.I. Pigment Orange 5 and 62, and C.I. Pigment Red 17, 49:2, 112, 149, 177, 178, 188, 255, and 264 and/or ink (B) which comprises at least one pigment selected from the group consisting of C.I. Pigment Blue 60, and C.I. Pigment Violet 3, 19, 23, 32, 36, and 38, wherein Ink (A) is an ink whose absorption area between 400 nm and 500 nm of ink (A) is no less than 0.5 times and no more than 2.0 times the absorption area between 500 nm and 600 nm of ink (A) and Ink (B) is an ink whose absorption area between 500 nm and 600 nm of ink (B) is no less than 0.5 times and no more than 5.0 times the absorption area between 600 nm and 700 nm of ink (B).

7. The ink set according to claim 1, wherein the pigment solids concentrations of the magenta ink and cyan ink are each 2 wt % or less, and the pigment solids concentrations of ink (A), ink (B), and the yellow ink are each 2 wt % or greater.

8. The ink set according to any of claim 1, wherein the pigment solids concentrations of the yellow ink, magenta ink, and cyan ink are each no less than 0.1 wt % and no more than 2 wt %, and the pigment solids concentrations of ink (A) and ink (B) are each no less than 2 wt % and no more than 6 wt %.

9. The ink set according to any of claim 1, wherein the pigment solids concentrations of the yellow ink, magenta ink, cyan ink, ink (A), and ink (B) are each 2 wt % or greater.

10. The ink set according to claim 1, wherein Ink (A) comprises a pigment selected from the group consisting of C.I. Pigment Red 149, 177, 178, and 264.

11. The ink set according to claim 1, wherein Ink (B) comprises a pigment selected from the group consisting of C.I. Pigment Violet 19 and 23 and C.I. Pigment Blue 60.

12. The ink set according to claim 1, wherein the magenta ink comprises a pigment selected from the group consisting of C.I. Pigment Red 122, 202, and 209, and C.I. Pigment Violet 19.

13. The ink set according to claim 1, wherein the cyan ink comprises a pigment selected from the group consisting of C.I. Pigment Blue 15:3 and 15:4.

14. The ink set according to claim 1, wherein the yellow ink comprises a pigment selected from the group consisting of C.I. Pigment Yellow 74, 110, 128, and 147.

15. The ink set according to claim 1, further comprising a black ink.

16. The ink set according to claim 1, wherein the optical density (OD value) of the yellow ink on a recording medium is between 1.7 and 2.4.

17. The ink set according to claim 1, wherein the optical density (OD value) of the magenta ink on a recording medium is between 1.0 and 2.6.

18. The ink set according to claim 1, wherein the optical density (OD value) of the cyan ink on a recording medium is between 2.0 and 2.7.

19. The ink set according to claim 1, wherein ink (A) is an ink for which the color saturation $C^*_{(Y+M)}$ of the hue angle $H°_{(Y+M)}$ formed by mixing the yellow ink of the weight $I_Y$ and magenta ink of the weight $J_{1M}$ on a recording medium is obtained by consuming a weight that is less than $(I_Y+J_{1M})$, wherein the color saturation $C^*$ is calculated using the formula $C^*=\{(a^*)^2+(b^*)^2\}^{1/2}.$]

20. The ink set according to claim 1, wherein ink (B) is an ink for which the color saturation $C^*_{(M+C)}$ of the hue angle $H°_{(M+C)}$ formed by mixing the magenta ink of the weight $J_{2M}$ and cyan ink of the weight $K_C$ on a recording medium is obtained by consuming a weight that is less than $(J_{2M}+K_C)$.

21. The ink set according to claim 1, wherein the color saturation $C^*_A$ of ink (A) is higher than the color saturation $C^*_Y$ of the yellow ink and/or the color saturation $C^*_M$ of the magenta ink.

22. The ink set according to claim 1, wherein the color saturation $C^*_B$ of ink (B) is higher than the color saturation $C^*_M$ of the magenta ink and/or the color saturation $C^*_C$ of the cyan ink.

23. The ink set according to claim 1, wherein the color saturation $C^*_A$ of ink (A) on a recording medium is 80 or greater.

24. The ink set according to claim 1, wherein the color saturation $C^*_B$ of ink (B) on a recording medium is 80 or greater.

25. The ink set according to claim 1, wherein the hue range of ink (A) on a recording medium is a*=about 60 to about 80 and b*=about 20 to about 80, or a*=about 30 to about 60 and b*=about 60 to about 100.

26. The ink set according to claim 1, wherein the hue range of ink (B) on a recording medium is a*=about 50 to about 70 and b*=about −70 to about −50, or a*=about 40 to about 60 and b*=about −80 to about −60.

27. The ink set according to claim 1, wherein the hue range of the yellow ink on a recording medium is a*=about −30 to about 20 and b*=about 70 to about 130; the hue range of the magenta ink is a*=about 60 to about 90 and b*=about −40 to about −10; and the hue range of the cyan ink is a*=about −50 to about −20 and b*=about −70 to about −40.

28. The ink set according to claim 1, wherein the recording medium is PM photographic paper.

29. An inkjet recording method comprising forming characters and/or images on a recording medium with the ink set according to claim 1.

30. The inkjet recording method according to claim 29, comprising forming a mixed color portion with ink (A) and/or ink (B), and at least one of the yellow ink, magenta ink, the cyan ink, or a black ink.

31. The inkjet recording method according to claim 29, comprising forming a mixed color portion with ink (A) or ink (B), and at least two types of inks other than ink (A) or ink (B) by ejecting droplets of each of a plurality of color inks such that, the droplets are mixed on the recording medium, and a mixed color portion comprising one or more colors is formed on the recording medium.

32. The inkjet recording method according to claim 29, comprising forming a, mixed color portion with ink (A) and/or ink (B) and at least the three color inks yellow, magenta, and cyan, with the mixed color portion being formed such that the chromaticity indices a* and b*, defined in the CIELAB color space on a recording medium, fall within the ranges a*=about −50 to about 50, and b*=about −50 to about 50, respectively.

33. The inkjet recording method according to claim 32, wherein the hue of the mixed color portion is a single color belonging to a hue group between white and black.

34. The inkjet recording method according to claim 29, comprising forming a mixed color portion with ink (A) and at least the two color inks yellow and magenta with the mixed color portion being formed such that the chromaticity indices a* and b*, defined in the CIELAB color space on a recording medium, fall within the ranges a*=about −40 to about 90, and b*=about −40 to about 100, respectively.

35. The inkjet recording method according to claim 34, wherein the hue of the mixed color portion is a single color belonging to a hue group between yellow and magenta.

36. The inkjet recording method according to claim 29, comprising forming a mixed color portion with ink (B) and at least the two color inks magenta and cyan with the mixed color portion being formed such that the chromaticity indices a* and b*, defined in the CIELAB color space on a recording medium, fall within the ranges a*=about −50 to about 100, and b*=about −10 to about −80, respectively.

37. The inkjet recording method according to claim 36, wherein the hue of the mixed color portion is a single color belonging to a hue group between magenta and cyan.

38. A recording device comprising the ink set according to claim 1.

39. Recorded matter recorded with the ink set according to claim 1.

\* \* \* \* \*